United States Patent [19]
Bradford

[11] 3,858,897
[45] Jan. 7, 1975

[54] SAFETY SLED

[76] Inventor: John Guythar Bradford, 47 Mansfield Dr., Ancaster, Ontario, Canada

[22] Filed: May 29, 1973

[21] Appl. No.: 364,319

[52] U.S. Cl. .................................. 280/17, 280/24
[51] Int. Cl. ............................................ B62b 13/04
[58] Field of Search ............... 280/15, 17, 18, 19, 24

[56] References Cited
UNITED STATES PATENTS

| | | | |
|---|---|---|---|
| 1,220,822 | 3/1971 | Brothen | 280/15 |
| 3,104,116 | 9/1963 | Knight | 280/18 |
| 3,202,437 | 8/1965 | Masbruch | 280/24 |

*Primary Examiner*—Robert R. Song
*Attorney, Agent, or Firm*—Burns, Doane, Swecker & Mathis

[57] ABSTRACT

A ski vehicle is described having unique self-braking and steering capabilities. It comprises an undercarriage structure mounted on a pair of non-steerable rear skis with downwardly extended keel members and a pair of steerable front skis also with keel members. The front skis are individually mounted on vertical pivots for horizontal turning and are interconnected by a parallel linkage steering hitch. The hitch has two spaced side limbs, one end of each of which is connected to one of the front skis for controlling horizontal turning thereof, with the ends of the limbs remote from the front skis being maintained a constant spaced distance apart by means of a rigid connector pivotally connected to the remote ends. This connector serves as a steering bar for the patroller controlling the vehicle and maintains the spacing of the remote ends to a distance substantially equal to the distance between the front ski vertical pivots, thereby forming a linkage parallelogram.

9 Claims, 15 Drawing Figures

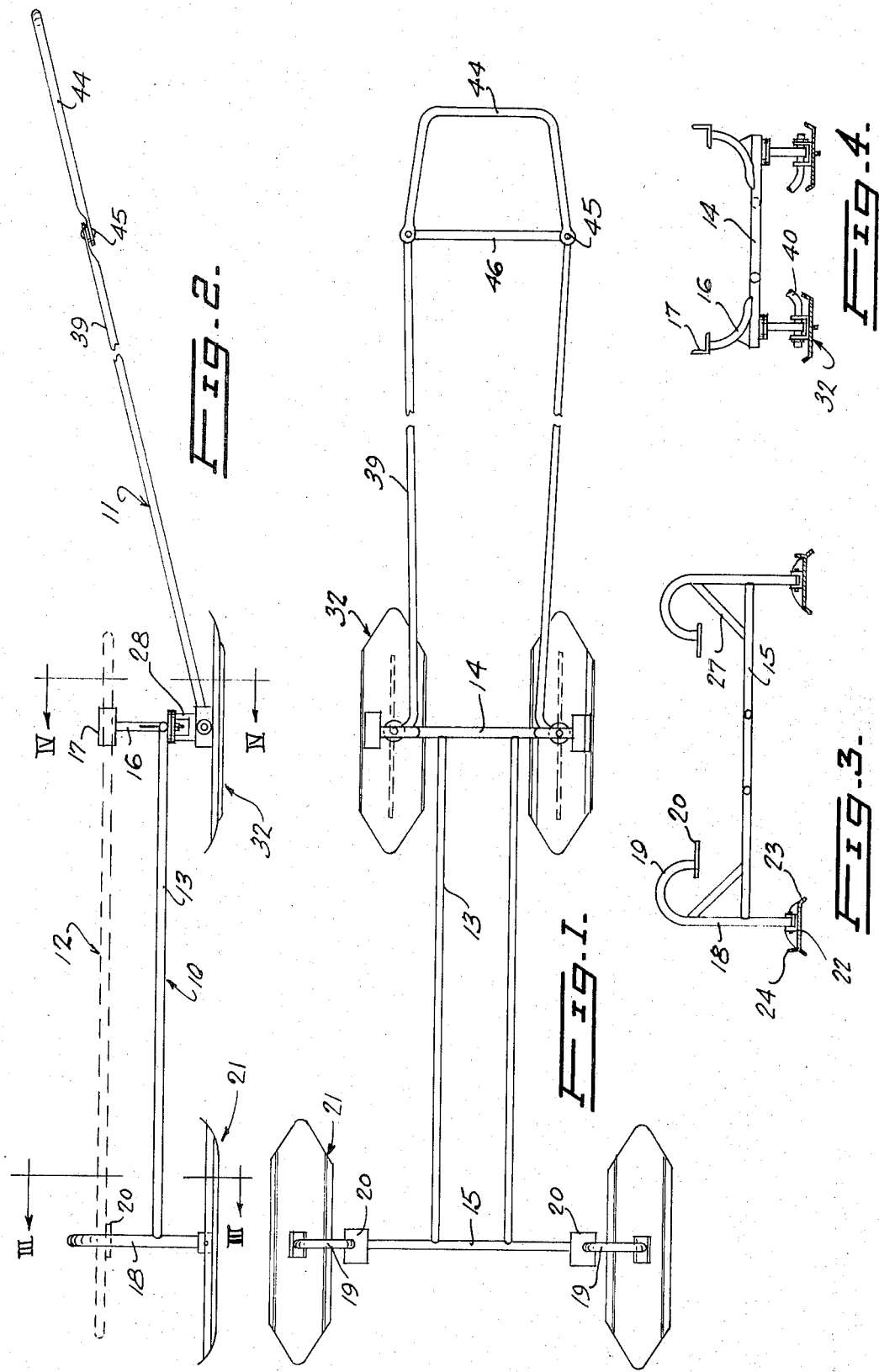

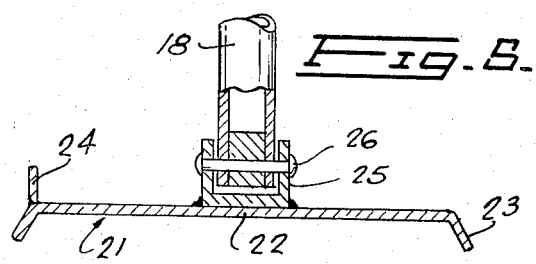
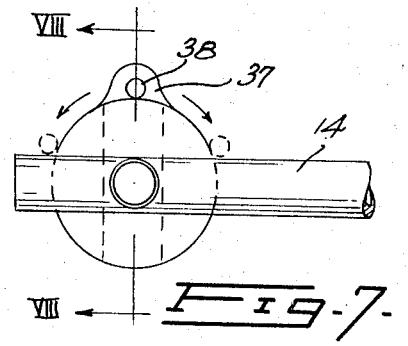
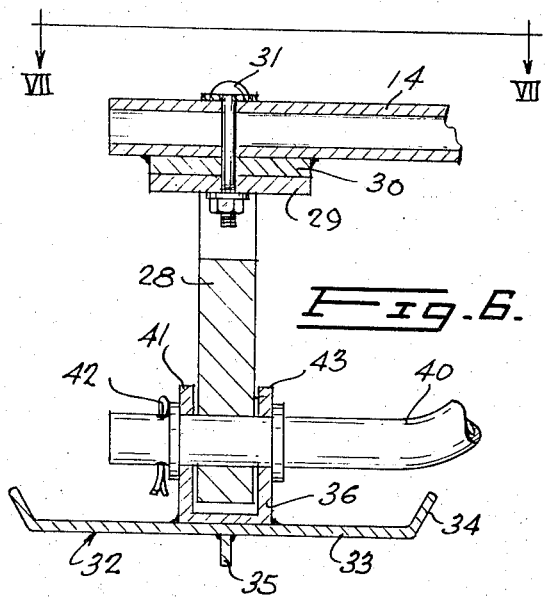
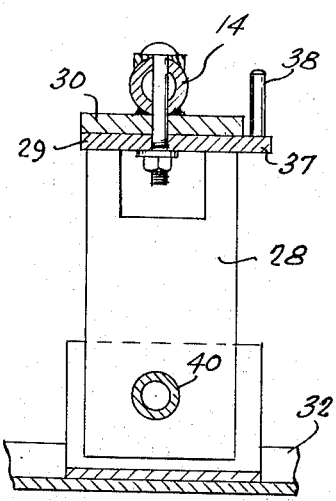
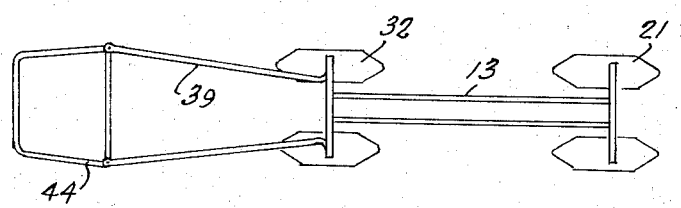
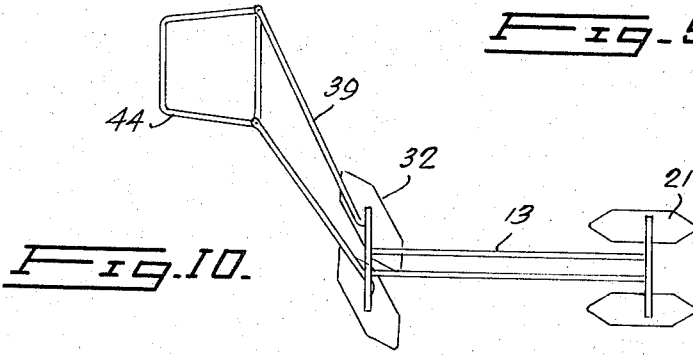

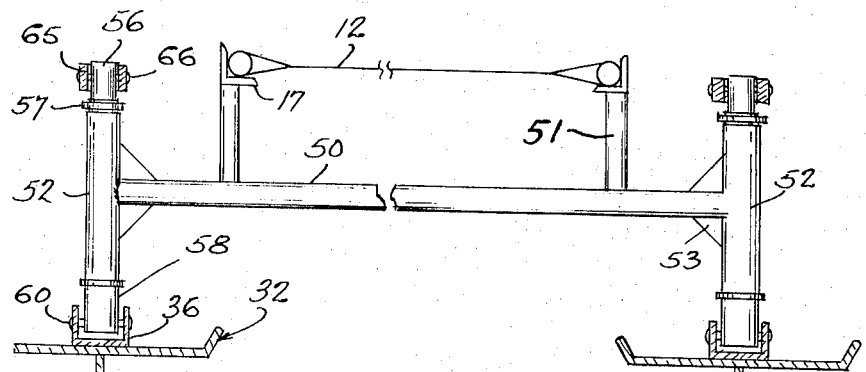
Fig. 11.
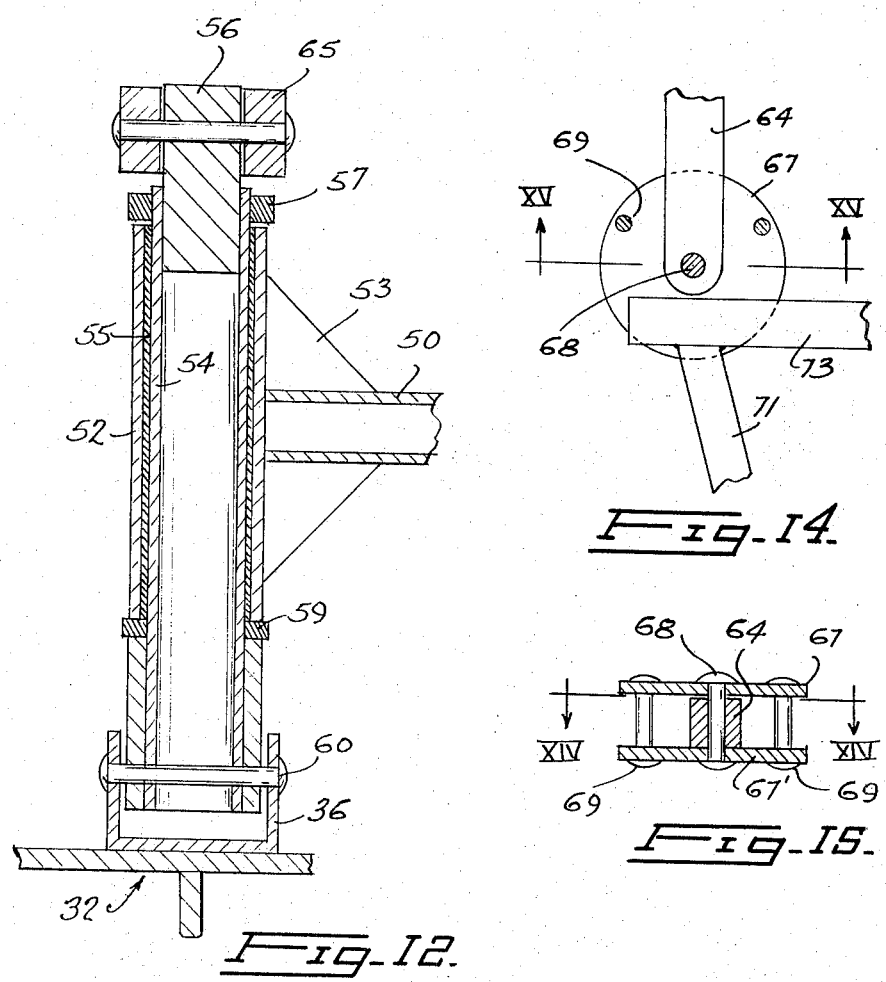
Fig. 12.
Fig. 14.
Fig. 15.

SAFETY SLED

BACKGROUND OF THE INVENTION

1. Field of the Invention

This invention is concerned with a ski vehicle for use in transporting an injured person on a stretcher or any other type of load over ice or snow and is particularly concerned with such a vehicle which can be controlled by one person even over extremely hazardous downhill terrain.

2. Description of the Prior Art

Various types of vehicles have been known for many years for transporting down a snow or ice covered hillside or mountainside a skier or climber who has sustained an injury. The best known of these is a kind of snow-boat or sled which can be seen at every ski resort and within which an injured skier is placed for bringing down the hillside. These sleds are normally handled by two ski patrollers, one of these being in front of the sled with a guiding hitch arrangement and the other being behind the sled to help in controlling it during its downward descent.

A typical example of a rescue sled of the above type can be seen in Kinraide U.S. Pat. No. 3,222,080 issued Dec. 7, 1965. The hitch included a keel and brake arrangement which could be engaged by the patroller handling the sled and the purpose of this was to try to avoid the necessity of a second patroller behind the sled. This did help somewhat in actual control of the sled on a hillside but there still remained the very serious disadvantage that these sleds in travelling over hard packed snow and moguls etc. tipped and bounced to an extreme degree causing great discomfort for the injured skier. It goes without saying that a skier with a serious fracture must be brought down the hillside as quickly as possible and also as gently as possible and there was no way of doing it gently with the traditional rescue sled.

Attempts have also been made to develop other type of rescue vehicles in the form of a type of stretcher supported on individual skis and while such a device was an improvement in terms of comfort for the injured person, they were still very difficult to handle for the rescue skier who was bringing the vehicle down the hillside.

It is, therefore, the object of the present invention to provide an improved form of ski vehicle which can be handled by a single rescue skier at high speeds over rough terrain while at the same time providing the injured person with a reasonably smooth and safe delivery to the bottom of the hill.

SUMMARY OF THE INVENTION

The ski vehicle according to the present invention comprises an undercarriage structure mounted on a pair of rear support skis and a pair of front support skis. The pair of rear skis are fixed against lateral turning while the front skis are individually mounted on vertical pivots for horizontal turning. These front skis are interconnected by a parallel linkage in the form of two spaced hitch side limbs, one end of each of which is connected to one of the pivotally mounted skis for controlling pivotal movement thereof, with the ends of the side limbs remote from the front skis being maintained a constant spaced distance apart by means of a rigid connector pivotally connected to the remote ends of the hitch side limbs. This connector maintains the spacing of the remote ends to a distance substantially equal to the distance between the vertical pivots, thereby forming a linkage parallelogram.

DESCRIPTION OF THE PREFERRED EMBODIMENTS

The rear skis are non-steerable and are preferably pivotally mounted on the undercarriage for rocking motion thereof about a substantially horizontal axis. Each rear ski can conveniently be formed of sheet metal or molded from a plastic and is preferably formed with a flat central web with the sides merging into downwardly directed skatelike edges. These edges resist lateral movement and ensure accurate tracking.

The front ski members are also preferably pivotally mounted for rocking motion about a substantially horizontal axis as well as being steerable. Each front ski is preferably formed from sheet metal or molded from a plastic with a flat central web having the sides merging into upturned flanges. A shallow keel member preferably extends along the length of the bottom face of each front ski.

The steering and controlling hitch preferably comprises a loop member constituted by two spaced side limbs connected to the front skis by means of horizontal pivotal connections permitting swinging of the side limbs through a vertical plane. The ends of the side limbs remote from the skis are pivotally connected to a rigid outer transverse member which maintains the two side limbs in parallel relationship thereby forming a linkage parallelogram. The outer rigid member is preferably of a U-shaped configuration to fit around the body of the skier who is operating the vehicle and provide a convenient hand grip.

This arrangement of skis and hitch has unique self-braking and steering capabilities which means safe, speedy rescue which is so vital in accident emergencies. Since the system both steers and brakes, the patroller handling the vehicle may ski parallel if he so desires. One man may handle a unit for any hill, over moguls, on ice, powder and deep snow. The unit may be moved in any direction along the hill and not necessarily following the fall line.

In order that the invention may be more clearly understood and more readily carried into effect, the vehicle will now, by way of example, be more fully described with reference to the accompanying drawings in which:

FIG. 1 is a top plan view of the vehicle;

FIG. 2 is a side elevation of the vehicle shown in FIG. 1;

FIG. 3 is an end elevation of the rear end of the vehicle;

FIG. 4 is an end elevation showing details of the front end of the vehicle;

FIG. 5 is an elevation in partial section showing details of a rear ski;

FIG. 6 is an elevation in partial section showing details of a front ski;

FIG. 7 is a top plan view showing details of a turning abutment;

FIG. 8 is an elevation view in partial section showing the abutment of FIG. 7;

FIG. 9 is a diagrammatic top plan view of the apparatus in aligned condition;

FIG. 10 is a diagrammatic top plan view of the apparatus in turning position.

FIG. 11 is an end elevation in partial section showing details of a second embodiment of the front end of the vehicle;

FIG. 12 is a vertical sectional view showing details of the front ski mounting of FIG. 11;

FIG. 14 is an enlarged top plan view of a hitch connection shown in FIG. 13; and FIG. 15 is a vertical sectional view of the connection shown in FIG. 14.

Figure 13:
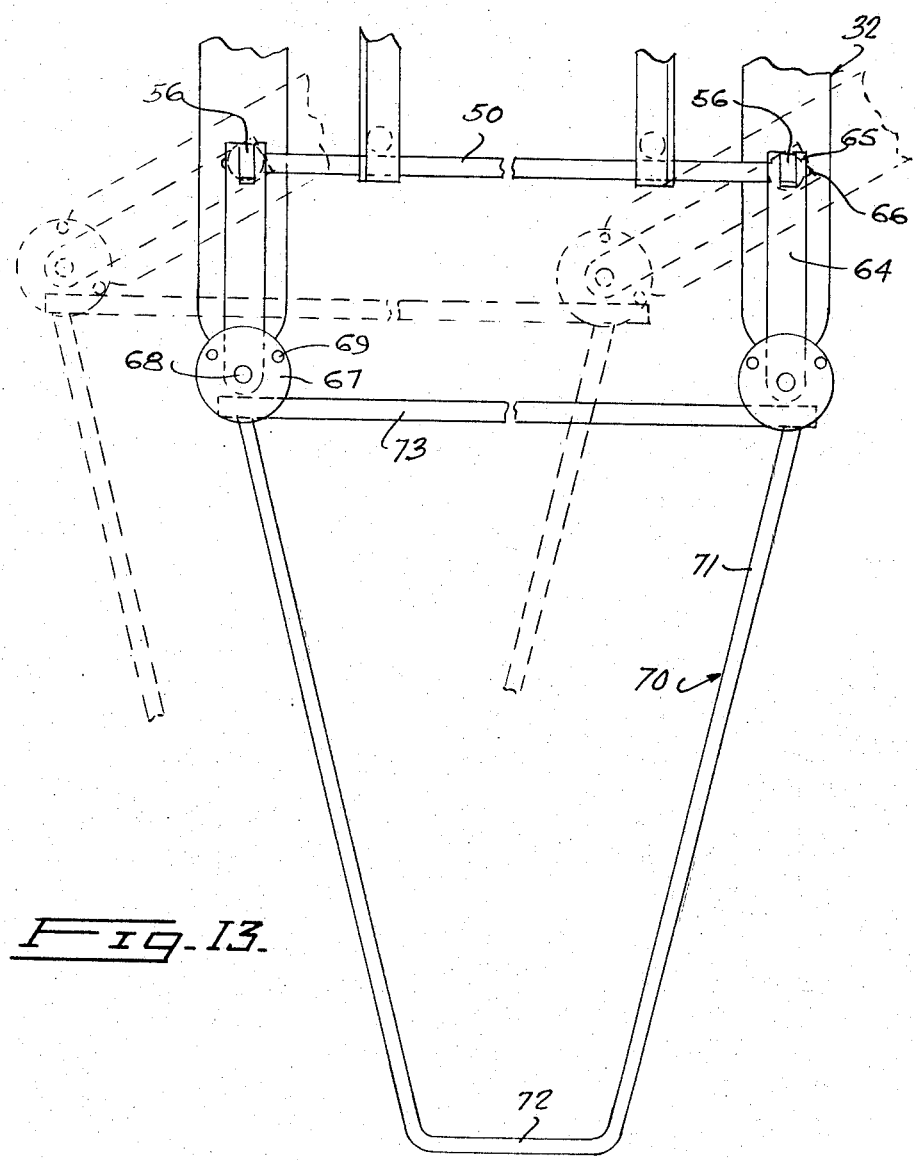
FIG. 13 is a top plan view of the front end of the vehicle shown in FIG. 11.

Referring to the drawings, the numeral 10 denotes generally a vehicle undercarriage while the numeral 11 denotes generally a hitch arrangement and 12 denotes a stretcher or other load carrying structure.

The undercarriage structure is in the form of a framework consisting primarily of one inch tubular steel with welded joints. It comprises two spaced parallel, longitudinally extending hollow tubular members 13, a front hollow tubular member 14 which is disposed transversely relative to the members 13 and to which the members 13 are secured as by welding and a rear hollow tube member 15 which is also disposed transversely relative to the members 13 and to which the members 13 are also secured, e.g. by welding.

A pair of curved tubular members 16 are welded at their lower ends to member 14 and the upper ends of members 16 have welded thereto short angle brackets 17 which serve as support members for a stretcher or other structure.

The ends of member 15 have welded thereto substantially vertical hollow tubular members 18 the upper end portions of which are inwardly bent to form loops 19 with inwardly and downwardly directed ends which have support plates 20 welded thereto. These plates 20 also act as support plates for a stretcher or other structure to be carried by the vehicle. Inclined hollow tubular members 27 constitute bracing struts and are welded to the members 18 and 15.

Mounted to the lower ends of tubular members 18 are rear ski members 21. Each ski member is preferably fabricated from sheet metal with a central flat web portion 22 terminating at the front and rear ends in upwardly turned and pointed end portions 22a and terminating at the sides in downwardly turned skate-like edges 23 which resist lateral movement. A vertically disposed plate 24 is mounted on the outer longitudinally extending edge portion of each of the rear skis and these plates 24 serve particularly during travel of the vehicle in deep snow, to resist any tendency for relative transverse movement between the snow and the vehicle such as to cause movement of the snow across the upper faces of the rear skis.

A U-shaped bracket 25 is welded to a central portion of each rear ski and the lower end of each member 18 is pivotally mounted within each bracket 25 by means of a horizontal pivot pin 26 thereby permitting rocking of the ski in a vertical plane.

Front skis 32 are mounted beneath the outer ends of member 14 and each front ski comprises a flat central web 33 terminating at the ends thereof in upwardly turned and pointed portions 33a and terminating at the sides thereof in upwardly turned flanges 34. A shallow keel 35 extends longitudinally down a central region of the bottom face of web 33. Welded to the upper face of web 33 in a central region thereof is a U-shaped bracket 36.

Between the ski 32 and member 14 is a ski turning arrangement in the form of a substantially vertical square tubular member 28 having welded to the upper end thereof a lower bearing plate 29. Also welded beneath member 14 is an upper bearing plate 30 which bears on plate 29. These bearing plates are held together in turning relationship by means of pivot pin 31. The lower bearing plate 29 also has an extension 37 in which is mounted a vertically extending pin 38. This pin 38 engages member 14 during a sharp turn of the vehicle and prevents jackknifing.

The lower end of member 28 is held in position within bracket 36 by means of a tubular member 40 forming part of the hitch structure, which tubular member extends through holes in the upturned portions of bracket 36 and a mating hole extending through the tubular member 28. A collar 41 and cotter pin 42 hold the tubular member 40 in position and a further collar 43 is mounted to control lateral movement of member 40. This connecting arrangement in a very simple manner permits rocking of the ski 32 in a vertical plane and also permits swinging of the hitch portion through a vertical plane while providing a positive connection between the hitch and the ski in terms of horizontal turning.

The hitch assembly 11 comprises two spaced limb members 39 having outwardly turned end portions 40 which interconnect with the front skis as described above. The ends of members 39 remote from the front skis 32 are arranged in parallel alignment with the vertical pivot for the front skis and are connected by means of pivotal connections 45 to a rigid U-shaped loop 46. For added stability a further crossbar 46 may be connected across between pivot connections 45. Thus, it will be seen that the hitch assembly constitutes, in essence, a linkage parallelogram.

When the vehicle is in use with an injured person lying on a stretcher 12 mounted on the vehicle, a patroller positions himself within a loop member 44 in front of crossbar 46 and holds the loop 44 in his hand. In travelling down a snow or ice covered hillside or mountainside the skier may execute all body motions which are normally made by skiers and the loop member 44 will at all times automatically remain in the optimum orientation with respect to the patroller. That is, the transverse limb 47 of the loop remains directly in front of the upper portion of the body of the patroller at all times. Thus, for example, if the patroller if travelling down the fall line of the hillside or mountainside, the transverse limb 47 of the loop 44 is substantially in front of the body of the patroller. If the patroller executes a turn, his skis are of course caused during this procedure to assume a direction which is at an angle to the fall line of the hill side, but during this procedure and during subsequent travel at an angle to the fall line, it is customary practice for the patroller to swivel about his hips in such a manner that the upper portion of his body continues to face approximately down the fall line. Thus, in all customary skiing positions the upper portion of the body of the patroller faces down, or at least approximately down, the fall line of the hill. The vehicle of the invention enables this to be achieved with the patroller requiring to alter his grip on the loop member 44. Thus, FIG. 9 in the accompanying drawings shows the operative orientation of the vehicle when the patroller is travelling down the fall line, while FIG. 10 shows in an extreme position the operative orientation of the vehicle as the patroller executes a turn. Traversing by the patroller across the hill will, of course, result in turning of the vehicle from the position shown in FIG. 10 to a position in which the vehicle is in alignment with the forward ski 32. When the patroller executes a parallel stop the vehicle will again assume the position shown in FIG. 10. During the execution of the parallel stop the patroller pulls backwards on the loop member 44 with the result that the vehicle tends to overshoot to one side or the other of the skier until it assumes the position shown in FIG. 10 in which the forward skis have achieved their maximum turning position with abutment pin 33 pressing into engagement with member 14. This provides a braking motion by side skidding of the front skis 32 but the vehicle itself continues to remain in a forward aligned position because the skate-like edges of the rearward skis prevent any lateral skidding of the rear skis.

For storage purposes and carrying, the entire hitch assembly can be pivoted beneath the vehicle to a position between the rear skis so as to form a compact package.

An additional embodiment of the steering and braking mechanism is illustrated in FIGS. 11 to 15. This utilizes the same basic vehicle structure as shown in FIGS. 1 to 8 with the same ski structures and same rear structure. Only the front ski mountings and hitch arrangement have been changed.

As shown in FIGS. 11 and 12, a front hollow tubular member 50 replaces the member 14 shown in FIGS. 1 to 8. To the ends of this member 50 are welded vertical tubular members 52 and this connection is reinforced by means of the reinforcing webs 53. Extending vertically upwardly from member 50 are a pair of posts 51 having welded to the tops thereof short angle brackets 17 which serve as the front support members for a stretcher 12 or other structure.

Each vertical tubular member 52 has an inner tubular member 54 extending therethrough. The inner member 54 is adapted to turn within the outer member 52 and a sleeve 55 of nylon or other plastic material is mounted between the two tubular members for ease of turning. The upper end of inner tubular member 54 has welded thereto a solid connector block 56 and also has an annular collar 57 fixed to the upper end thereof.

The lower end of inner tubular member 54 is surrounded by a lower tubular member 58 and these two members are fixed against movement relative to each other by means of a pivot pin 60 extending therethrough and connecting both tubular members to bracket 36 of front ski 32. Between the upper end of the lower tubular member 58 and the lower end of tubular member 52 is mounted a rotatable washer 59 which provides a rotatable bearing surface between the members 52 and 58. In other words, the front end of the vehicle is supported on the ski 32 via tubular member 52, washer 59, lower tubular member 58 and bracket 36. This arrangement permits free turning of the ski relative to the vehicle frame in a horizontal plane as well as rocking in a vertical plane.

The connector block 56 has pivotally connected thereto a limb member 64. This limb member 64 has at one end thereof a pair of connector ears 65 and these are connected to the member 56 by means of pivot pin 66 for swinging in a vertical plane.

The forward end of limb member 64 is pivotally connected by means of a vertical pivot pin 68 to a plate member 67. As will be seen from FIG. 15, the forward end of limb member 64 is actually sandwich between an upper plate 67 and a lower plate 67' for free turning in a horizontal plane. An additional pair of pins 69 extend between the upper and lower plate 67 and 67' and these pins 69 serve as abutments for limiting the degree of turning of limb member 64 in the manner shown in FIG. 13.

Also rigidly fixed between plates 67 and 67' is a hitch member 70 in the form of a generally U-shaped loop having a pair of side arms 70 and a front bar 72. The rear ends of the side arms 71 are welded to a rigid cross bar 73 thereby forming a totally rigid hitch structure. The cross bar 73 is sandwiched between the plates 67 and 67' and is securely welded to both plates.

This hitch structure steers and brakes in precisely the same manner as described with respect to FIGS. 9 and 10 except that because of the quite short limb member 64 the patroller handling the vehicle is able to effect turning and braking with a minimum of lateral movement. In fact, this can be accomplished with practically no lateral movement on the part of the patroller and steering or braking can be achieved merely by moving the hitch bar a short distance to the left or right. By pulling backwards on front bar 72 the brakes will automatically lock to left or right as illustrated by the broken lines in FIG. 13, according to the direction pursued by the patroller at the time of applying the brakes.

It has been found to be particularly desirable to position the abutment pins 69 such that the front skis 32 can turn a maximum of about a 60° angle from the straight ahead position. This gives optimum braking without jack-knifing of the vehicle.

I claim:

1. A ski vehicle for use in carrying an injured skier on a stretcher or other load, said vehicle comprising an undercarriage structure supported at the rear end by a pair of non-steerable skis having downwardly extending keel members and supported at the front ends by a pair of steerable skis, said front skis being individually mounted for horizontal turning and being interconnected by a parallel linkage for parallel turning, said linkage being in the form of a pair of side limb members, each being pivotally connected at one end to a front ski for swinging through a vertical plane and extending forwardly of the ski and said limb members being pivotally connected at their forward ends remote from the skis to a rigid steering bar which maintains the remote ends a fixed distance apart thereby forming a linkage parallelogram.

2. A ski vehicle according to claim 1, wherein the front skis also have downwardly extending keel members.

3. A ski vehicle according to claim 2, wherein the front and rear skis are pivotally mounted for rocking in a vertical plane.

4. A ski vehicle according to claim 1, wherein the rigid steering bar is substantially U-shaped with the ends thereof being pivotally connected to the remote ends of the limb members.

5. A ski vehicle according to claim 4, wherein a straight, rigid bar is pivotally connected across between the pivotally connected ends of the U-shaped steering bar and remote ends of the limb members.

6. A ski vehicle according to claim 1, wherein each front ski is mounted on the bottom end of a vertical post which is rotatable about its vertical axis.

7. A ski vehicle according to claim 6, wherein each limb member is connected to one of said vertical posts.

8. A ski vehicle according to claim 7, wherein each vertical post is mounted for rotation within a vertical sleeve which is fixed to the undercarriage, with each limb member being connected to a said vertical post at a location above said sleeve.

9. A ski vehicle according to claim 1, wherein abutments are provided limiting the degree of turn of the front skis to a maximum of about a 60° angle from the straight ahead position.

* * * * *